(12) United States Patent
Sato

(10) Patent No.: US 10,649,525 B2
(45) Date of Patent: May 12, 2020

(54) DISPLAY DEVICE THAT CONTROLS SCREEN DISPLAY ACCORDING TO GAZE LINE OF USER, AND IMAGE FORMING APPARATUS

(71) Applicant: KYOCERA Document Solutions Inc., Osaka (JP)

(72) Inventor: Masaru Sato, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 16/371,493

(22) Filed: Apr. 1, 2019

(65) Prior Publication Data
US 2019/0317596 A1 Oct. 17, 2019

(30) Foreign Application Priority Data
Apr. 13, 2018 (JP) ................. 2018-077508

(51) Int. Cl.
*G06F 3/01* (2006.01)
*G06F 3/0481* (2013.01)
*G06F 3/0487* (2013.01)

(52) U.S. Cl.
CPC ............ *G06F 3/013* (2013.01); *G06F 3/0481* (2013.01); *G06F 3/0487* (2013.01); *G09G 2320/0693* (2013.01)

(58) Field of Classification Search
CPC ............ G06F 3/011–013; G06F 3/048; G06F 3/0481; G06F 3/0482; G06F 3/04842; G06F 3/04845
See application file for complete search history.

(56) References Cited

U.S. PATENT DOCUMENTS

| | | | | |
|---|---|---|---|---|
| 10,061,471 | B2 * | 8/2018 | Lee | G06F 3/013 |
| 2016/0188162 | A1 * | 6/2016 | Lee | G06F 3/04817 |
| | | | | 715/788 |
| 2016/0231812 | A1 * | 8/2016 | Hansen | G06F 3/013 |
| 2017/0270383 | A1 * | 9/2017 | Onomura | G06T 7/74 |
| 2017/0293352 | A1 * | 10/2017 | Todeschini | G06F 3/013 |
| 2018/0181811 | A1 * | 6/2018 | Yakishyn | G06K 9/00597 |

FOREIGN PATENT DOCUMENTS

JP 2006-023953 A 1/2006

* cited by examiner

*Primary Examiner* — Gene W Lee
(74) *Attorney, Agent, or Firm* — IP Business Solutions, LLC

(57) ABSTRACT

A display device includes a display unit, a gaze line detection unit, and a control unit that includes a processor, and acts, when the processor executes a control program, as a gaze line concentration area detector that detects a gaze line concentration area on the screen, according to a trajectory of the gaze line on the screen detected by the gaze line detection unit, a counter that counts a number of objects displayed in the gaze line concentration area detected, and a display controller that enters an enlarged display mode in which the display object is displayed in an enlarged size, when one display object is included in the gaze line concentration area, and enters a help display mode in which help information is displayed, when no gaze line concentration area is detected, or when a plurality of display objects are included in the gaze line concentration area.

11 Claims, 12 Drawing Sheets

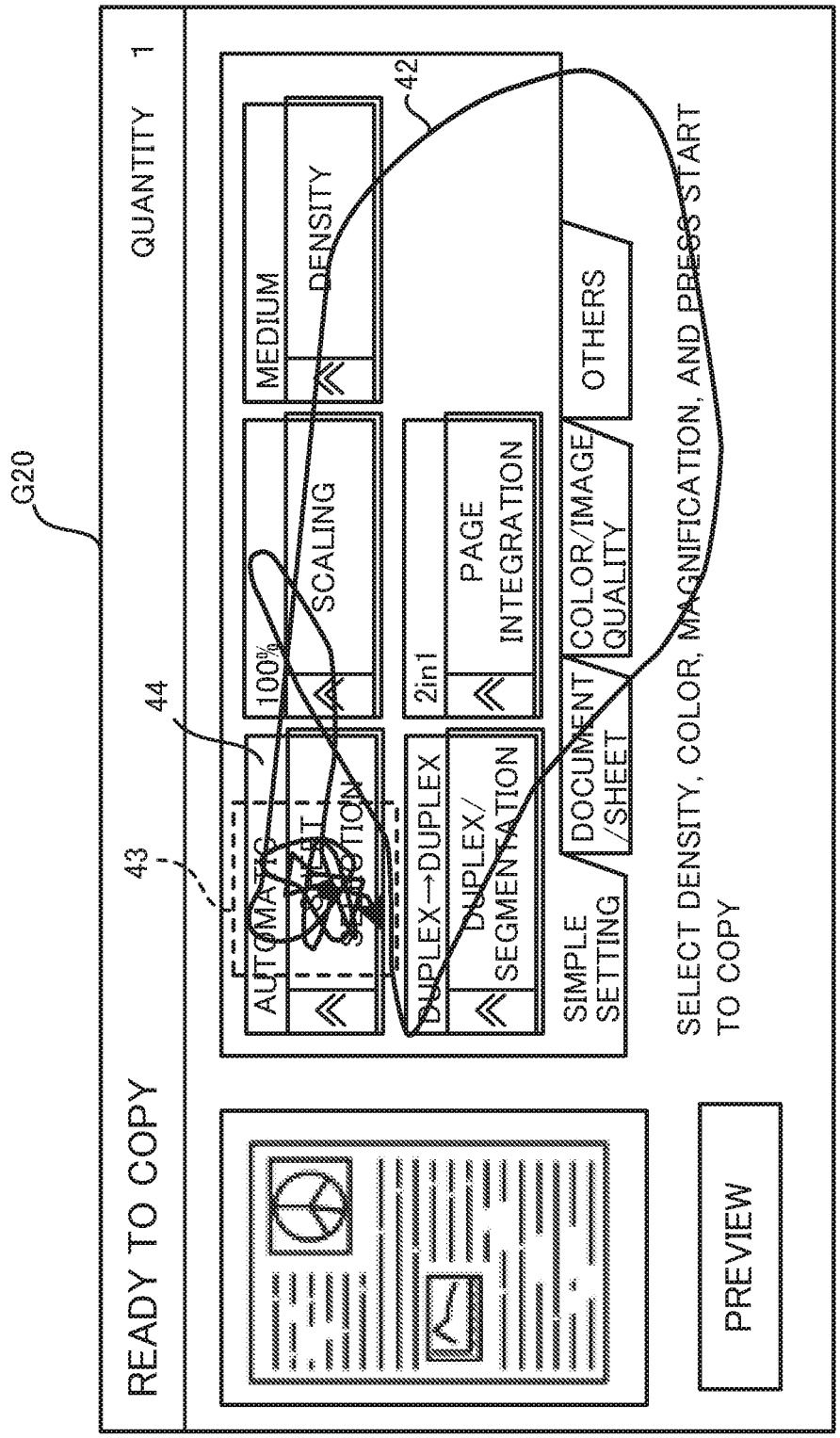

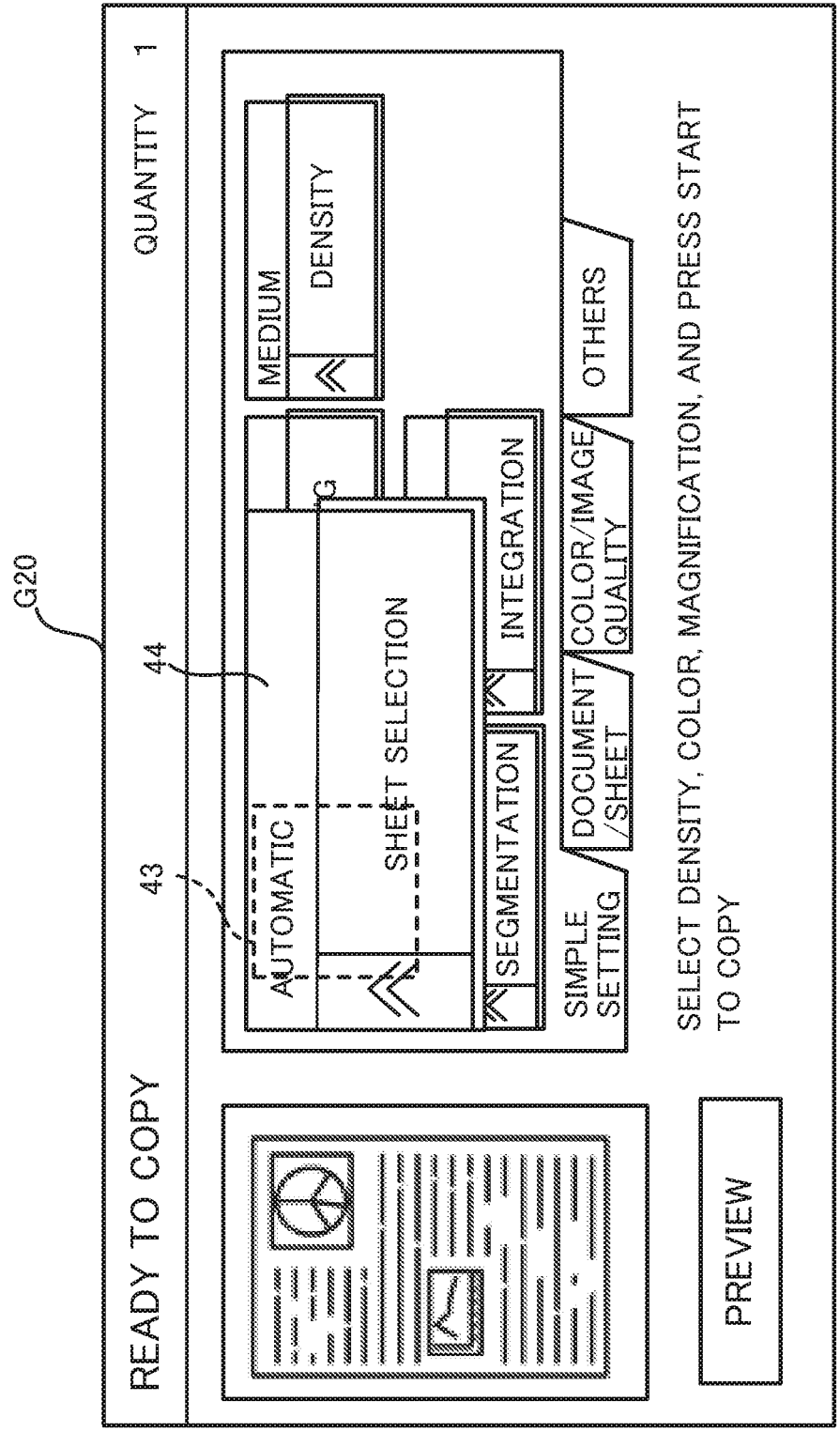

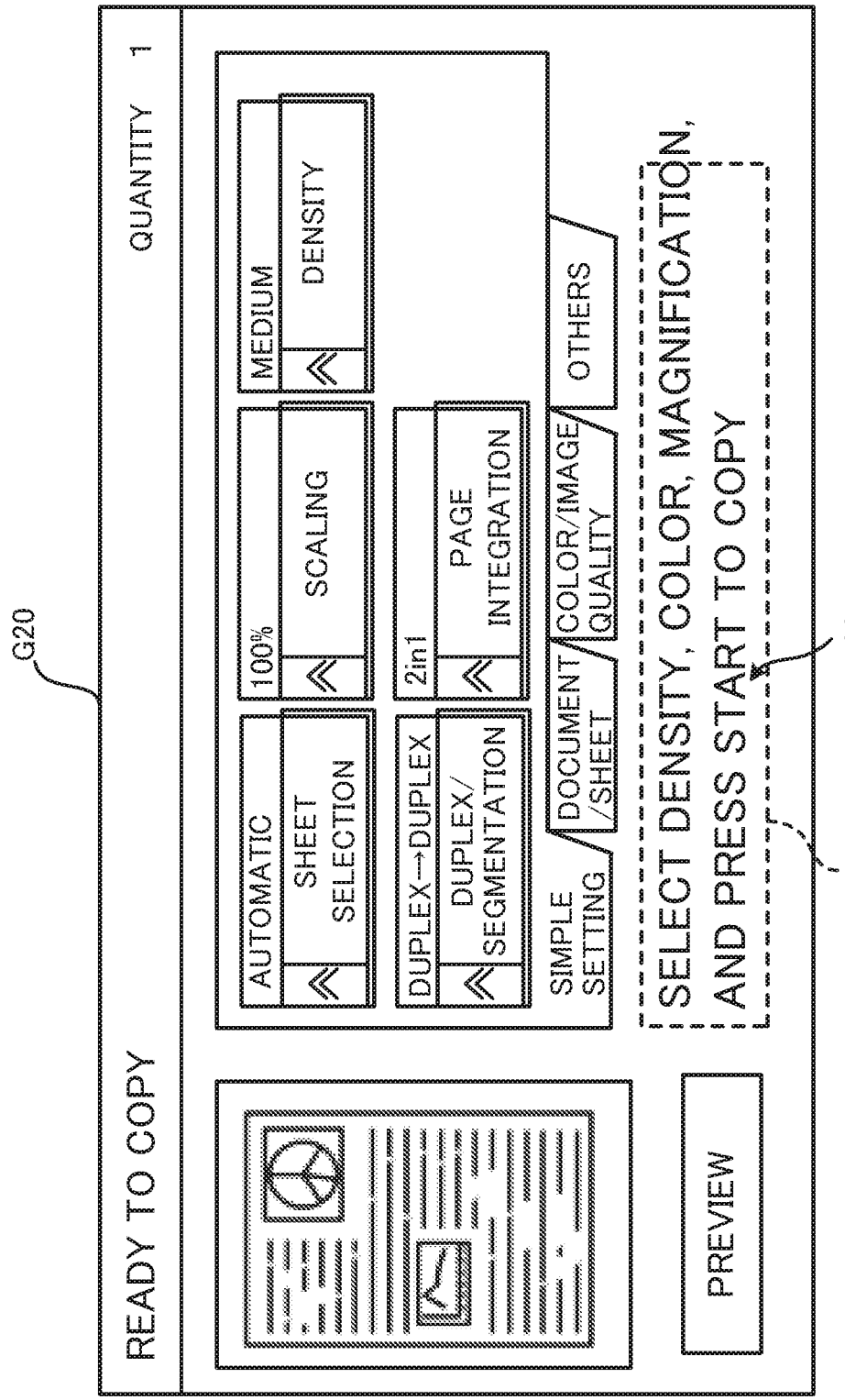

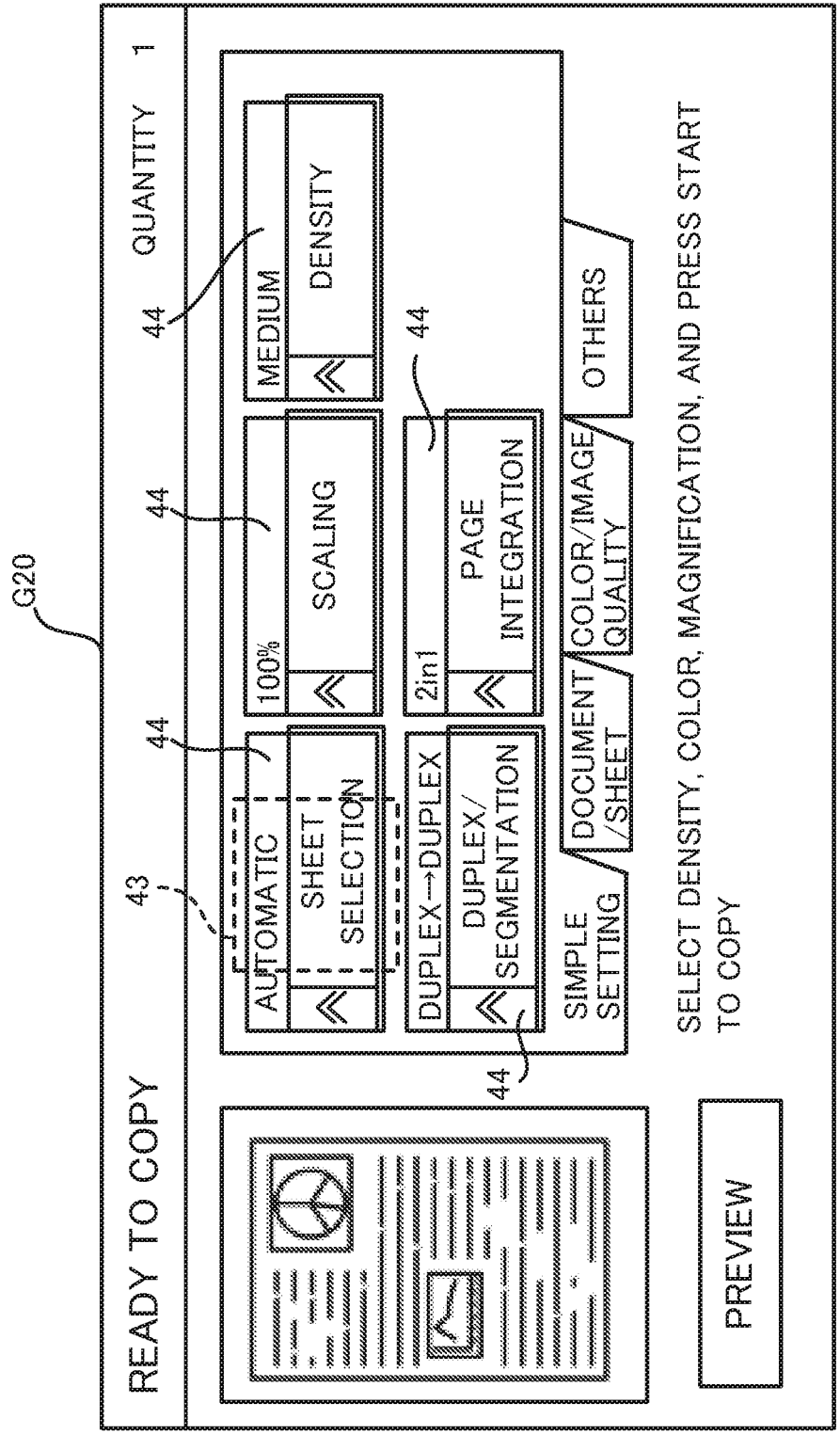

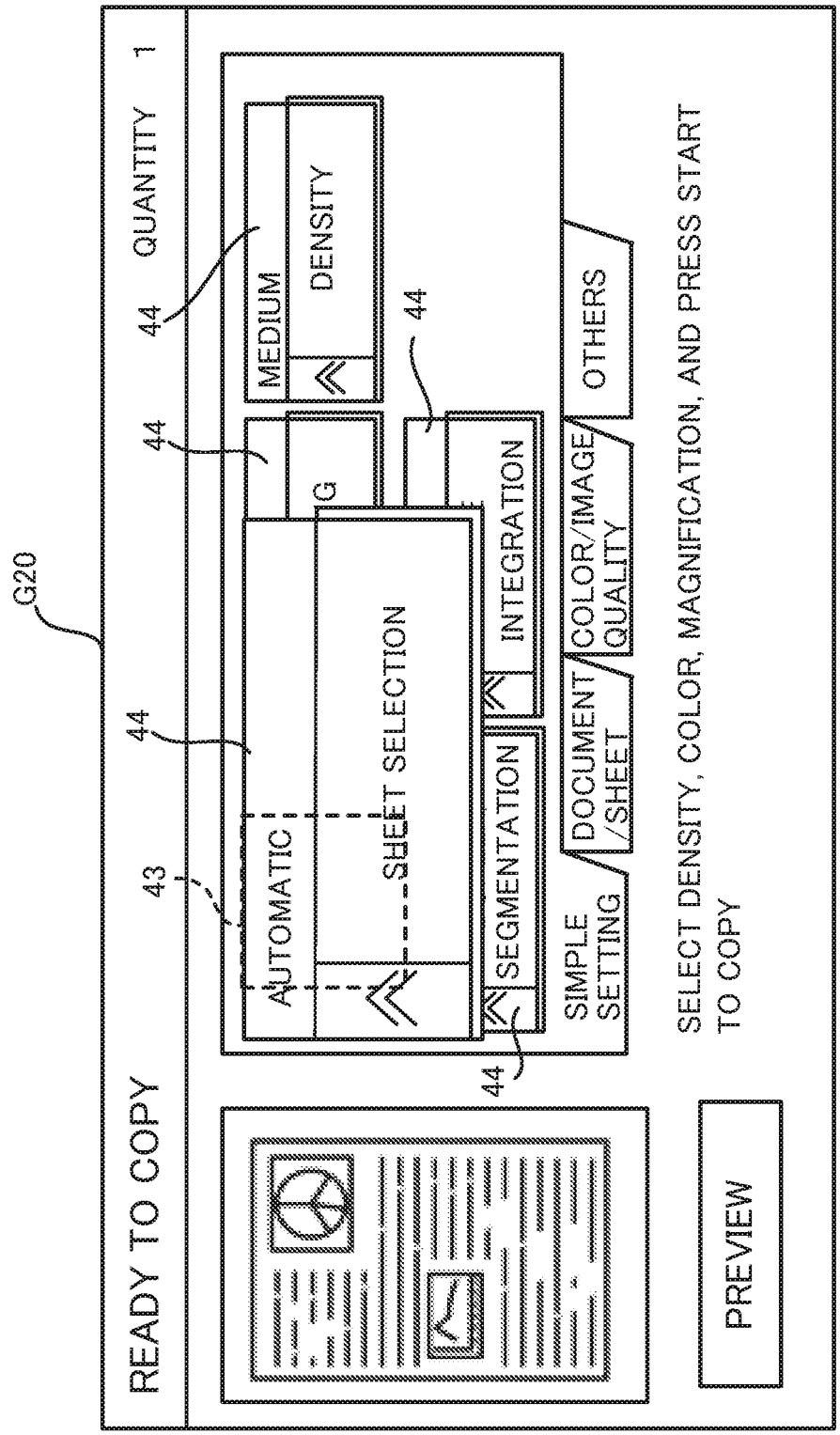

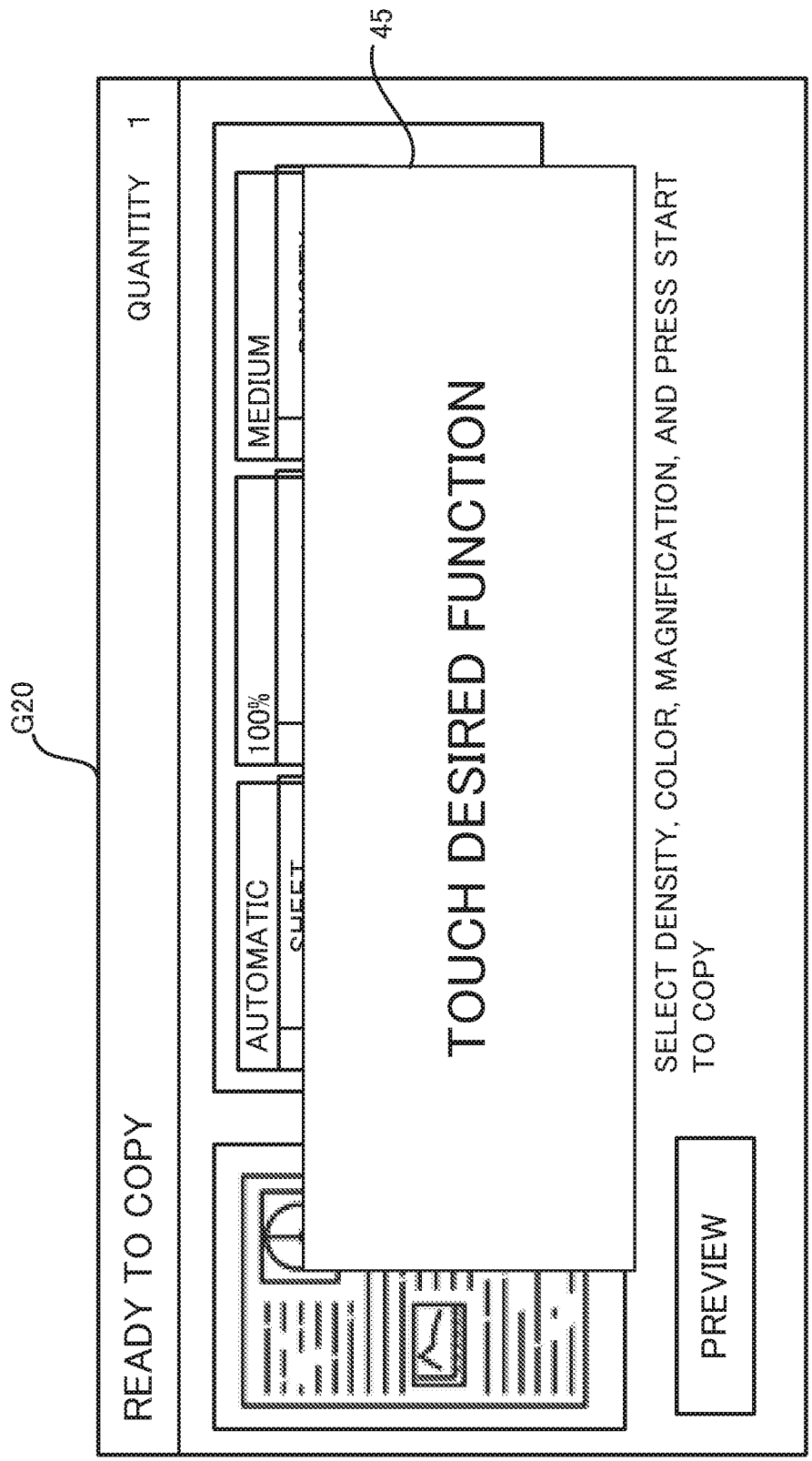

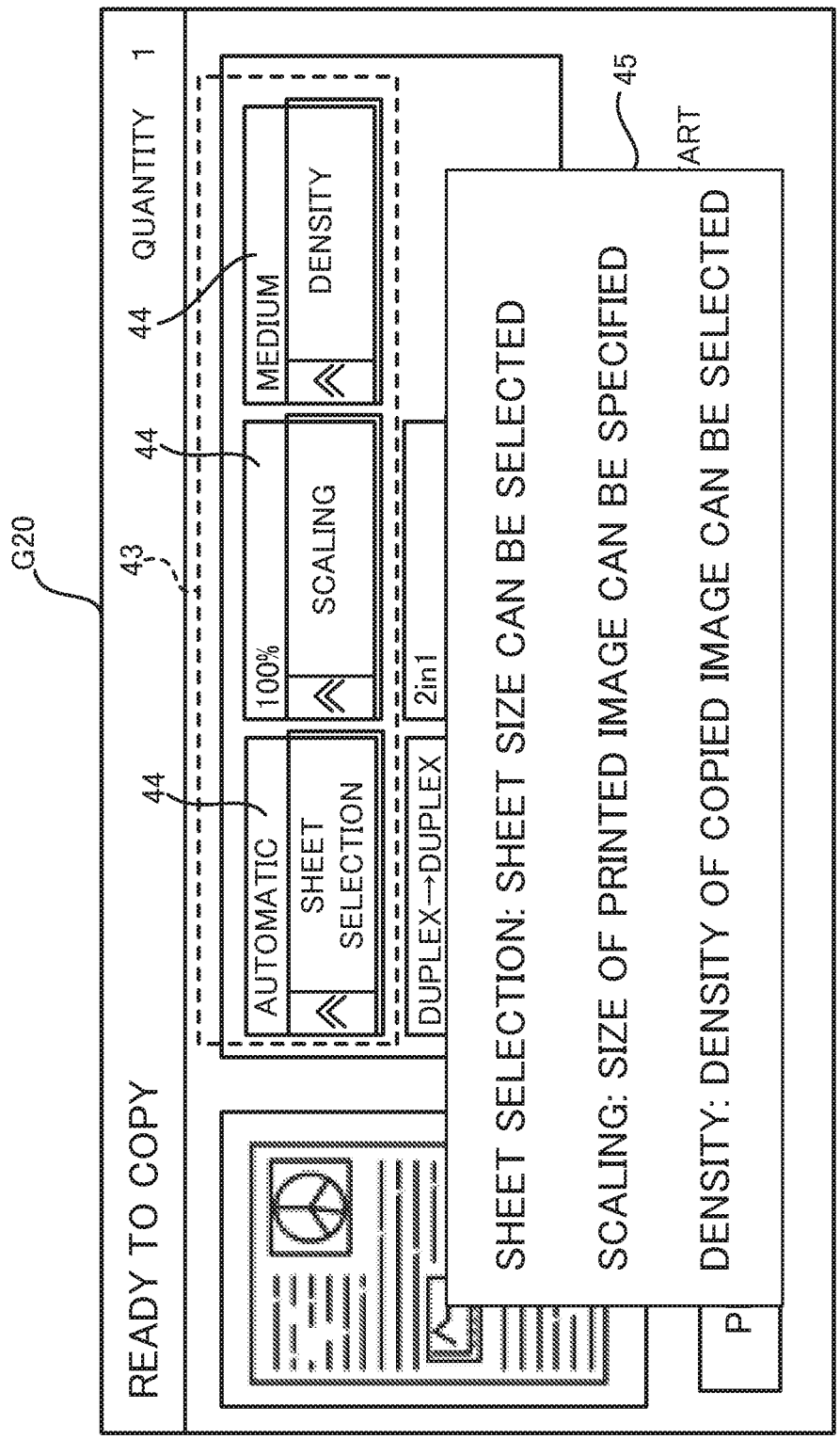

DISPLAY DEVICE THAT CONTROLS SCREEN DISPLAY ACCORDING TO GAZE LINE OF USER, AND IMAGE FORMING APPARATUS

INCORPORATION BY REFERENCE

This application claims priority to Japanese Patent Application No. 2018-077508 filed on Apr. 13, 2018, the entire contents of which are incorporated by reference herein.

BACKGROUND

The present disclosure relates to a display device that controls a display on a screen according to a gaze line of a user, and to an image forming apparatus.

For example, a technique is known that includes shooting the face of a user operating a screen, and estimating the age of the user and the distance between the face and the screen, to facilitate the user to recognize characters on the screen, by changing the size thereof.

SUMMARY

The disclosure proposes further improvement of the foregoing technique.

In an aspect, the disclosure provides a display device including a display unit, a gaze line detection unit, and a control unit. The display unit displays a screen. The gaze line detection unit detects a gaze line of a user directed to the screen. The control unit includes a processor, and acts as a gaze line concentration area detector, a counter, and a display controller, when the processor executes a control program. The gaze line concentration area detector detects a gaze line concentration area on the screen, according to a trajectory of the gaze line on the screen detected by the gaze line detection unit. The counter counts a number of display objects included in the gaze line concentration area, when the gaze line concentration area is detected. The display controller enters an enlarged display mode in which the display object is displayed in an enlarged size, when one display object is included in the gaze line concentration area, and enters a help display mode in which help information is displayed, when no gaze line concentration area is detected, or when a plurality of display objects are included in the gaze line concentration area.

BRIEF DESCRIPTION OF THE DRAWINGS

FIG. 5A and FIG. 5B are schematic drawings each showing a number of display objects included in the gaze line concentration area;

FIG. 6A and FIG. 6B are schematic drawings each showing a display example in an enlarged display mode;

FIG. 7A and FIG. 7B are schematic drawings each showing another display example in the enlarged display mode; and FIG. 8A and FIG. 8B are schematic drawings each showing a display example in a help display mode.

DETAILED DESCRIPTION

Hereafter, an embodiment of the disclosure will be described in detail, with reference to the drawings. In the embodiment described below, elements having a similar function are given the same numeral.

Figure 1:
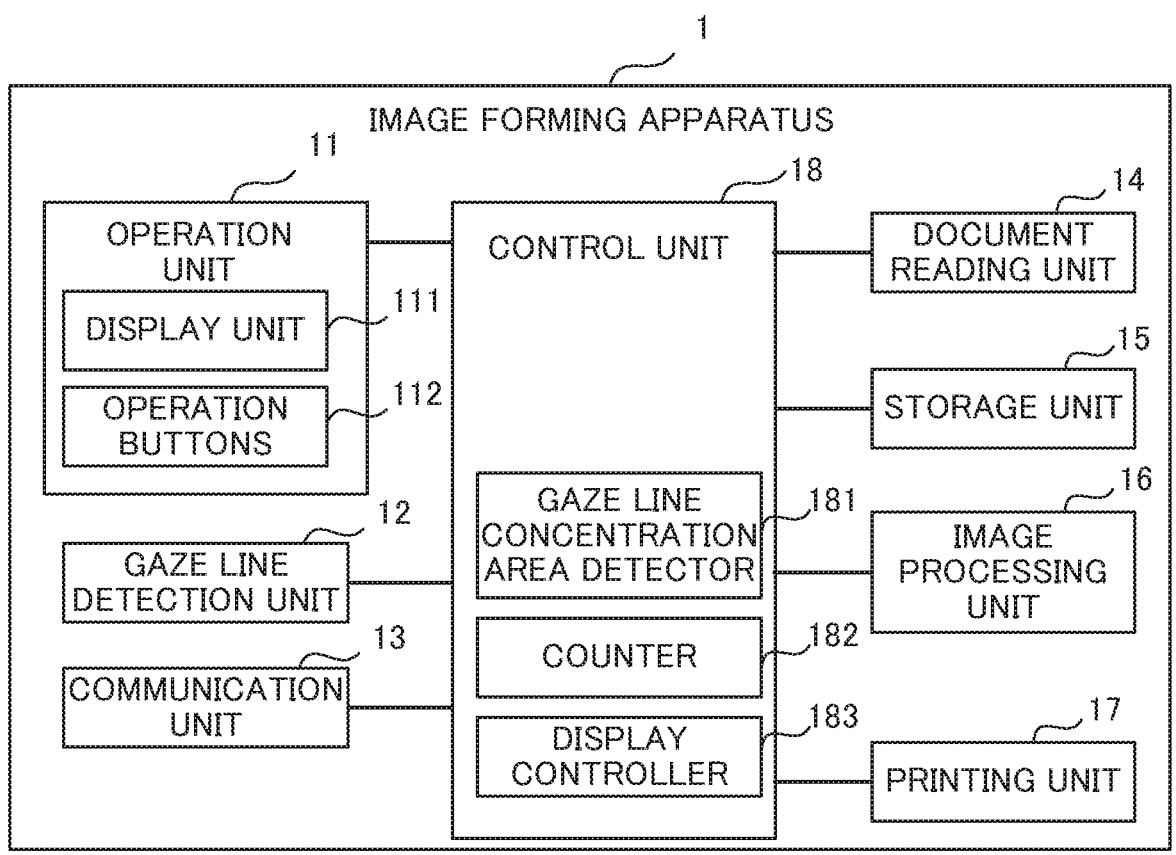
FIG. 1 is a block diagram showing a general configuration of an image forming apparatus according to an embodiment of the disclosure.

Referring to FIG. 1, an image forming apparatus 1, exemplifying the display device according to the embodiment, will be described. The image forming apparatus 1 includes an operation unit 11, a gaze line detection unit 12, a communication unit 13, a document reading unit 14, a storage unit 15, an image processing unit 16, a printing unit 17, and a control unit 18.

The operation unit 11 includes a display unit 111 and operation buttons 112. The display unit 111 displays various operation keys and an image forming status, on the screen. The display unit 111 may be a touch panel having a transparent pressure sensor provided on the surface, to serve as a display device and an input device. The operation buttons 112 include various operation keys, such as a tenkey for inputting numerals such as the number of sheets to be printed, a reset key for inputting an instruction to initialize setting information, a stop key for stopping a copying operation, and a start key for inputting an output instruction to start a printing operation.

The gaze line detection unit 12 includes a camera located at a position where the face of a user operating the display unit 111 can be shot, and detects the gaze line of the user directed to the screen of the display unit 111, on the basis of image data acquired by the camera.

The communication unit 13 is configured to transmit and receive various data to and from an external terminal device, through a network such as a local area network (LAN). The communication unit 13 is a communication interface including a communication module such as a non-illustrated LAN chip.

The document reading unit 14 is a scanner that emits light to a source document, fed by a non-illustrated document feeder or placed by the user on a platen glass, to read the document image by receiving the reflected light, and outputs the image data.

The storage unit 15 is a storage device such as a semiconductor memory or a hard disk drive (HDD), in which the image data acquired by the document reading unit 14, and image data received through the communication unit 13 are stored.

The image processing unit 16 performs image processing, with respect to the image data. The image processing unit 16 performs, for example, scaling, density adjustment, or gradation adjustment of the image.

The printing unit 17 is a printing mechanism configured to print the image data. The printing unit 17 forms a latent image on a photoconductor drum, for example according to image data read out from the storage unit 15, forms a toner image from the latent image using a toner, transfers the toner image from the photoconductor drum to a recording sheet transported from a non-illustrated paper feed unit, and outputs the recording sheet having the toner image fixed thereon. For example, the printing unit 17 executes a printing operation on the recording sheet, by transferring the toner image formed on the photoconductor drum to the recording sheet, and fixing the toner image on the recording sheet.

The control unit 18 is connected to the operation unit 11, the gaze line detection unit 12, the communication unit 13, the document reading unit 14, the storage unit 15, the image processing unit 16, and the printing unit 17, and controls the overall operation of the image forming apparatus 1, according to instructions inputted through the operation unit 11. The control unit 18 is an information processing unit such as a microcomputer, including a processor, a read-only memory (ROM), a random-access memory (RAM). The processor is, for example, a central processing unit (CPU), an MPU, or an ASIC. The ROM contains a control program for controlling the operation of the image forming apparatus 1. The CPU of the control unit 18 reads out the control program stored in the ROM, and deploys the control program on the RAM for execution, to thereby control the overall operation of the apparatus, according to the instruction inputted through the operation unit 11. Here, the control program may be stored in the ROM, through a non-illustrated network, or a non-illustrated computer-readable recording medium.

The control unit 18 acts as a gaze line concentration area detector 181, a counter 182, and a display controller 183, when the processor executes the control program.

Figure 2:
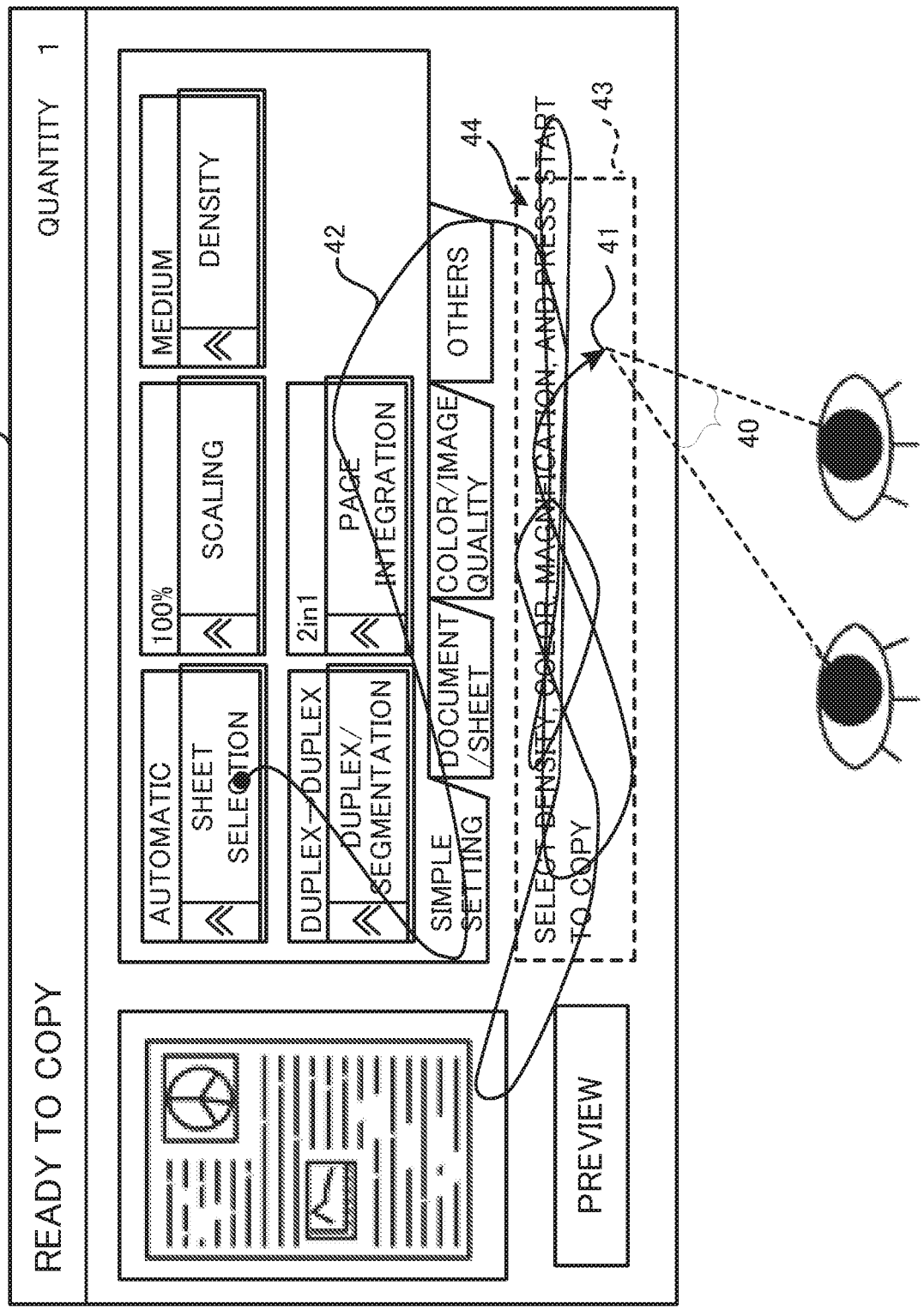
FIG. 2 is a schematic drawing showing a movement of a gaze line directed to a screen.

The gaze line concentration area detector 181 is configured to detect, as shown in FIG. 2, a gaze line concentration area 43 in which a gaze line 40 of the user is concentrated on the screen G20, according to a trajectory 42 of the gaze line 40 on the screen G20 detected by the gaze line detection unit 12.

For example, when the gaze line detection unit 12 detects the gaze line 40 directed to the screen G20, the gaze line concentration area detector 181 monitors the trajectory 42 of a gaze point 41, which is the intersection of the gaze line 40 and the screen G20, for a predetermined time (e.g., 5 seconds). The gaze line concentration area detector 181 may calculate the density distribution of the trajectory 42 of the gaze point 41 on the screen G20 during the predetermined, and detect an area where the calculated density distribution is higher than a predetermined threshold (e.g., average value), as the gaze line concentration area 43. For example, the gaze line concentration area detector 181 may divide the screen G20 into a plurality of sections, and detect a section that includes the largest number of points of the trajectory 42 sampled at predetermined time intervals, as the gaze line concentration area 43. In the case where a plurality of sections include the largest number of sampled points of the trajectory 42, the plurality of sections may be detected as the gaze line concentration area 43. Further, the sections where the number of sampled points of the trajectory 42 is equal to or larger than a predetermined threshold may be detected as the section where the density of the trajectory 42 is highest, in other words the gaze line concentration area 43.

The counter 182 is configured to count the number of display objects 44 included in the gaze line concentration area 43, when the gaze line concentration area detector 181 detects the gaze line concentration area 43. The counter 182 may include a display object 44 in the counts, when a part of that display object 44 (i.e., a part of the display region) is included in the gaze line concentration area 43, or when equal to or more than half of the display region of the display object 44 is included in the gaze line concentration area 43.

Here, the display object 44 refers to, for example, characters representing information, and icons, displayed on the screen G20.

The display controller 183 is configured to enter an enlarged display mode, in which the display object 44 is displayed in an enlarged size, when the gaze line concentration area detector 181 detects the gaze line concentration area 43, and when there is one display object 44 in the gaze line concentration area 43. In addition, the display controller 183 enters a help display mode in which help information is displayed, when no gaze line concentration area 43 is detected, or when a plurality of display objects 44 are included in the gaze line concentration area 43. In the case where no display object 44 is included in the gaze line concentration area 43 detected, the display controller 183 does not have to display the enlarged object or help information.

Figure 3:
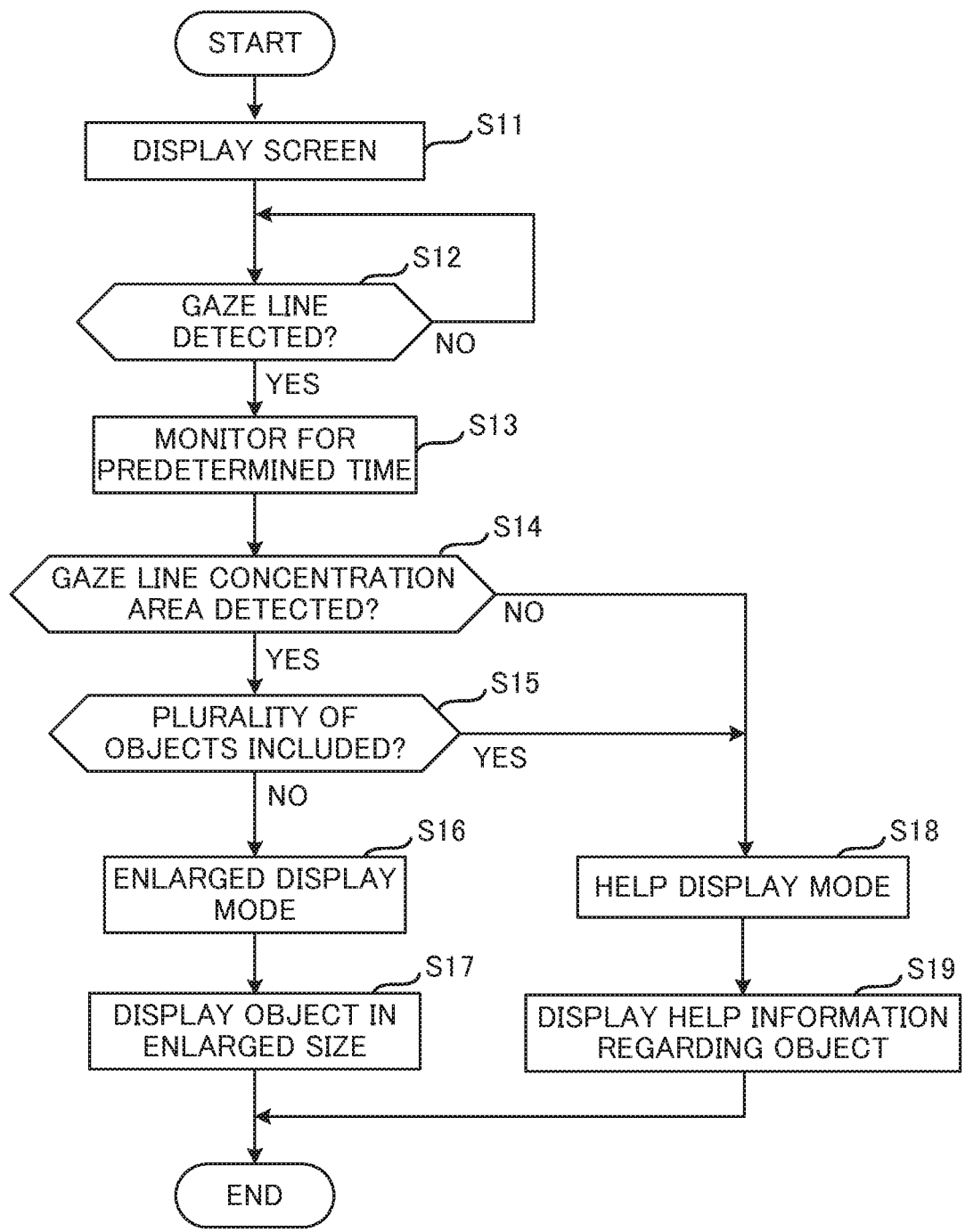
FIG. 3 is a flowchart showing a display control process based on the gaze line, performed by the image forming apparatus shown in FIG. 1.

Referring to FIG. 3, the display control process based on the gaze line 40 of the user will be described hereunder.

When the screen G20 is displayed on the display unit 111 (S11), the gaze line detection unit 12 stands by for detection of the gaze line 40 of the user directed to the screen G20 (No at s12).

When the gaze line detection unit 12 detects the gaze line 40 directed to the screen G20 (Yes at s12), the gaze line concentration area detector 181 monitors the movement of the gaze line 40 for a predetermined time, through the gaze line detection unit 12 (S13).

Then the gaze line concentration area detector 181 decides whether the gaze line concentration area 43, where the gaze line 40 is concentrated on the screen G20, has been detected, on the basis of the trajectory 42 of the gaze line 40 created during the predetermined time (S14).

Figure 4A:
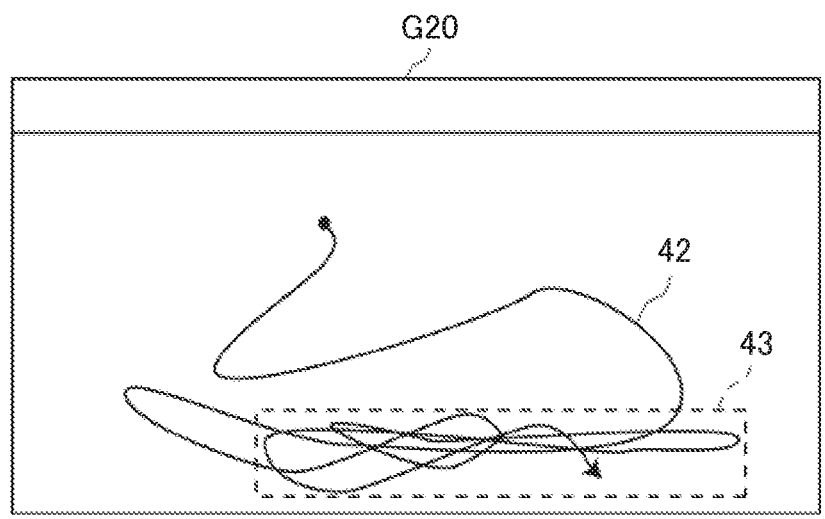
FIG. 4A is a schematic drawing showing a case where a gaze line concentration area is detected, on the basis of the trajectory of the gaze line.
Figure 4B:
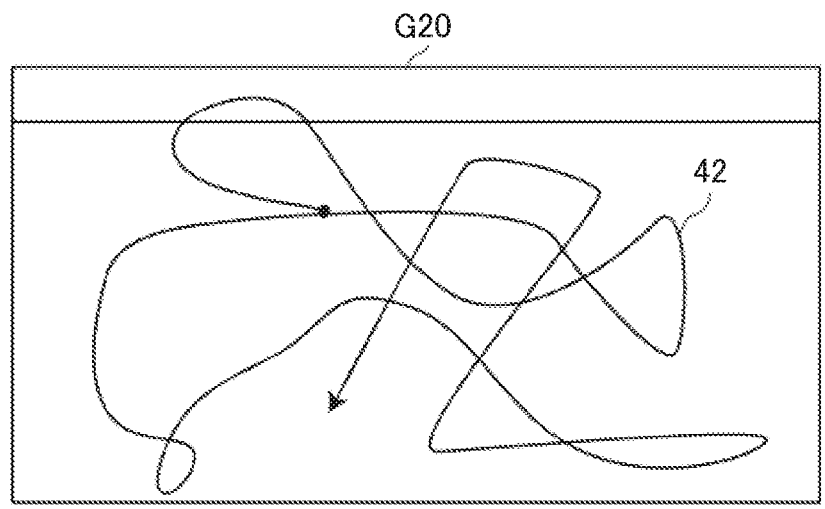
FIG. 4B is a schematic drawing showing a case where a gaze line concentration area is not detected, on the basis of the trajectory of the gaze line.

For example, FIG. 4A and FIG. 4B each illustrate the trajectory 42 created on the screen G20 during the predetermined time. For the sake of clarity in the description of the trajectory 42, the display objects 44 in the screen G20 are omitted in these drawings. Regarding FIG. 4A, the density distribution of the trajectory 42 over the screen G20 is higher in the lower region, and therefore the gaze line concentration area 43 is detected. In FIG. 4B, in contrast, the density distribution of the trajectory 42 over the screen G20 is generally uniform, and therefore the gaze line concentration area 43 is not detected. Thus, since the gaze line concentration area detector 181 detects the gaze line concentration area 43 on the basis of the density distribution of the trajectory 42 of the gaze line 40 created during the predetermined time, the gaze line concentration area 43 can be detected with high accuracy, even though the gaze line 40 of the user is momentarily deviated or shifted.

Figure 5B:
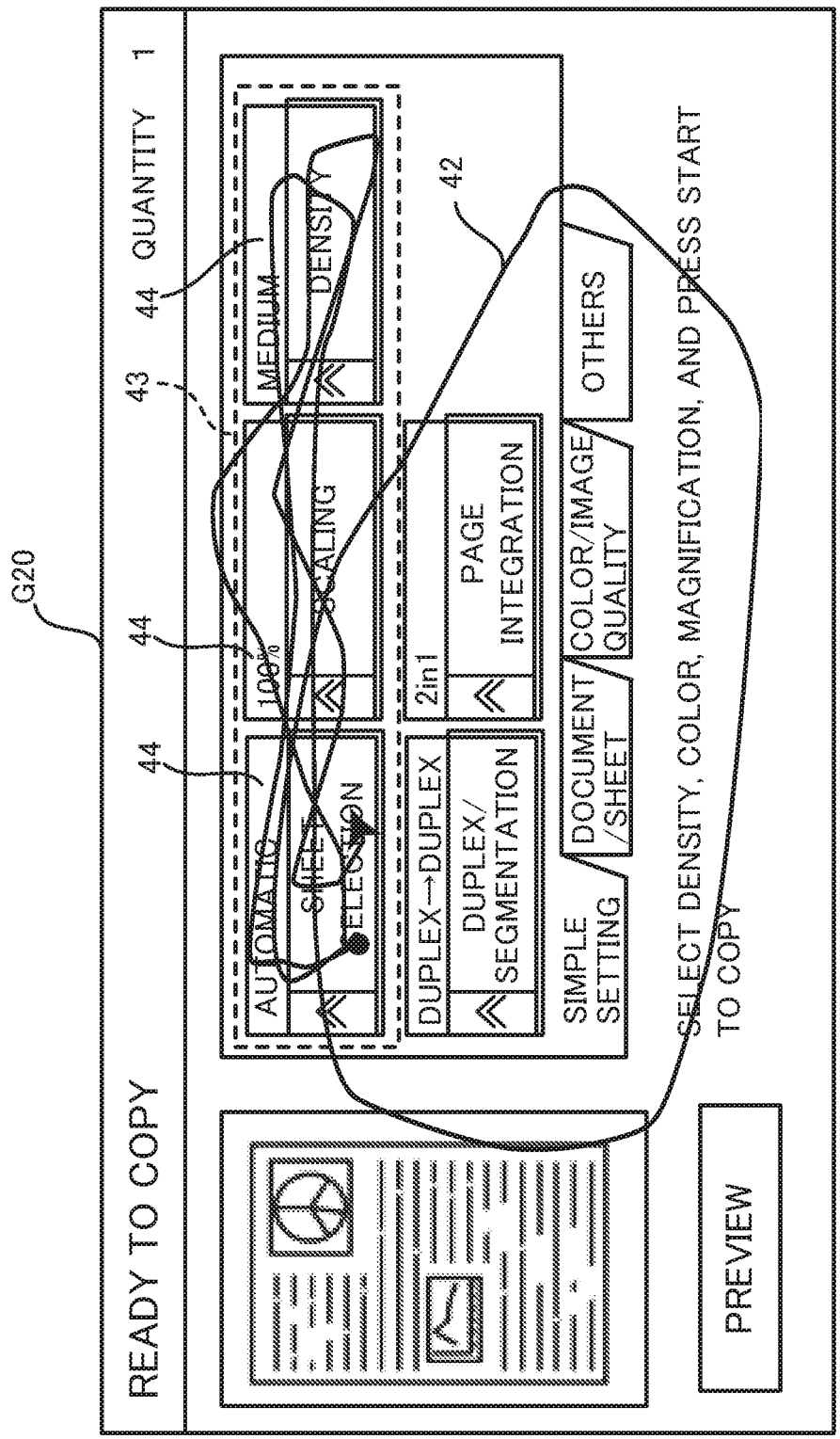

When the gaze line concentration area 43 has been detected (Yes at s14), the counter 182 counts the number of display objects 44 included in the gaze line concentration area 43, and decides whether a plurality of display objects 44 are included in the gaze line concentration area 43 (S15). For example, FIG. 5A illustrates the case where an icon is included in the gaze line concentration area 43 as the display object 44, and FIG. 5B illustrates the case where three icons are included in the gaze line concentration area 43, as the display objects 44.

When a plurality of display objects 44 are not included in the gaze line concentration area 43 (No at s15), in other words there is only one display object 44 in the gaze line concentration area 43, the display controller 183 enters the enlarged display mode (S16). In the enlarged display mode, the display controller 183 enlarges the size of the display object 44 on the screen G20 (S17).

When there is only one display object 44 in the gaze line concentration area 43 as above, the visibility of the display object 44 is often poor, and therefore it is highly likely that the user is intensely gazing at the display object 44. Accordingly, the operation of the display controller 183 to enter the enlarged display mode to enlarge the size of the display object 44 in the gaze line concentration area 43 increases the visibility of the display object 44, to thereby improve the operability of the apparatus.

For example, FIG. 6A illustrates an enlarged state of the display object 44 in the gaze line concentration area 43 shown in FIG. 5A, and FIG. 6B illustrates an enlarged state of the display object 44 in the gaze line concentration area 43 shown in FIG. 2. As shown in FIG. 6A and FIG. 6B, the display controller 183 enlarges only the display object 44 included in the gaze line concentration area 43 at a predetermined magnification ratio, and keeps the display size of the remaining display objects 44, in other words the display objects 44 not included in the gaze line concentration area 43, unchanged.

In addition, FIG. 7A illustrates another enlarged state of the display object 44 in the gaze line concentration area 43 shown in FIG. 5A. When the display object 44 included in the gaze line concentration area 43 is an icon, and a plurality of icons are arranged therearound, the display controller 183 may enlarge the size of the icon included in the gaze line concentration area 43, as well as the size of the other icons, to such an extent that the icons adjacent to each other are kept from overlapping, as shown in FIG. 7A. Normally, a space (margin) is provided between the icons located adjacent to each other, to avoid a congested appearance. Therefore, the display controller 183 can enlarge the icons, utilizing such a space.

Further, in the case where, when all the icons are enlarged as above, the magnification ratio of the icon included in the gaze line concentration area 43 is lower than a predetermined ratio, the display controller 183 may enlarge only the icon included in the gaze line concentration area 43 at the predetermined magnification ratio, and display this icon so as to be overlaid on the adjacent icons, as shown in FIG. 7B.

Alternatively, the display controller 183 may enlarge the entirety of the screen G20, in other words all the display objects 44 on the screen G20. Further, when the entirety of the screen G20 is enlarged, the display controller 183 may also enlarge the entirety of the screen G20 to be displayed next.

In contrast, in the case where no gaze line concentration area 43 has been detected (No at s14), or a plurality of display objects 44 are included in the gaze line concentration area 43 (Yes at s15), the display controller 183 enters the help display mode (S18). In the help display mode, the display controller 183 displays help information regarding the display object 44 (S19).

In such a case as above, where the gaze line concentration area 43 has not been detected, or where, although the gaze line concentration area 43 has been detected, a plurality of display objects 44 are included therein, it can be presumed that the user is at a loss about how to operate, from the fact that the gaze line 40 of the user is unstably roaming on the screen G20. Accordingly, the operation of the display controller 183 to enter the help display mode and display the help information facilitates the user's operation, thereby improving the operability of the apparatus.

For example, FIG. 8A illustrates an example of the help information, displayed when no gaze line concentration area 43 is detected, as shown in FIG. 4B. When no gaze line concentration area 43 is detected, it is probable that the user is unaware of how to handle the display object 44 on the screen G20. Accordingly, the display controller 183 displays help information 45 about the handling of the display object 44, for example a message like "touch a desired function", on the screen G20.

Further, FIG. 8B illustrates an example of the help information, displayed when a plurality of display objects 44 are included in the gaze line concentration area 43, as shown in FIG. 5B. When a plurality of display objects 44 are included in the gaze line concentration area 43 detected (see FIG. 5B), the user may be at a loss about how to operate, because of being unfamiliar with the functions of the respective display objects 44. Therefore, the display controller 183 displays the help information 45 describing the functions of the respective display objects 44 included in the gaze line concentration area 43, on the screen G20.

In this case, it is preferable that the display controller 183 displays the help information 45 so as not to overlap with the display objects 44 in the gaze line concentration area 43 (see FIG. 8B). In the case where the area for displaying the help information 45 is too small, because the gaze line concentration area 43 is located close to the center of the screen G20, the display controller 183 may shift the display position of the display objects 44 included in the gaze line concentration area 43 upward or downward, or to the left or right on the screen G20, to thereby broaden the area for displaying the help information 45.

Further, the display controller 183 may erase the help information 45 displayed as above from the screen G20, after a predetermined time has elapsed, or in response to an operation performed by the user.

When the enlarging of the display (S17), or the display of the help information (S19), performed by the display controller 183 is finished, the display control process is finished.

Here, after enlarging the display of the display object 44, the display controller 183 may sequentially shift the object to be enlarged to another display object 44 located at the gaze point 41, each time the display object 44 at the gaze point 41 is shifted according to the movement of the gaze line 40 detected by the gaze line detection unit 12. In this case, the display objects 44 located ahead of the gaze line 40 of the user can be enlarged one after another, after the display controller 183 has once entered the enlarged display mode.

In addition, after displaying the help information 45, the display controller 183 may sequentially shift the object about which the help information is to be displayed, to another display object 44 located at the gaze point 41, each time the display object 44 at the gaze point 41 is shifted according to the movement of the gaze line 40 detected by the gaze line detection unit 12. In this case, the help information 45 about the display objects 44 located ahead of the gaze line 40 of the user can be displayed one after another, after the display controller 183 has once entered the help display mode.

As described above, the display device according to this embodiment includes the display unit 111 that displays the screen G20, the gaze line detection unit 12 that detects the gaze line 40 of the user directed to the screen G20, the gaze line concentration area detector 181 that detects the gaze line concentration area 43 on the screen G20, according to the trajectory 42 of the gaze line 40 on the screen G20 detected by the gaze line detection unit 12, the counter 182 that counts the number of display objects 44 included in the gaze line concentration area 43, when the gaze line concentration area 43 is detected, and the display controller 183 that enters the enlarged display mode to display the display object 44 in an enlarged size, when one display object is included in the gaze line concentration area 43, and enters the help display mode to display the help information 45, when no gaze line concentration area 43 is detected, or when a plurality of display objects 44 are included in the gaze line concentration area 43.

With the mentioned configuration, the display device decides whether the user is troubled by the poor visibility of the screen G20, or at a loss about how to operate, on the basis of the gaze line 40 of the user, and enlarges the size of the display object 44 on the screen G20 upon deciding that the visibility is poor, but displays the help information 45 regarding the display object 44 on the screen G20, upon deciding that the user is at a loss about how to operate. Therefore, the screen G20 can be appropriately displayed according to the situation of the user, and consequently the user-friendliness of the device can be improved.

Here, with the technique according to the foregoing background art, whether the user is troubled by the poor visibility of the screen G20, or at a loss about how to operate, is unable to be decided, which makes it difficult to provide an appropriate screen display.

In contrast, the foregoing embodiment provides a technique that improves the operability of the device, for the user who is troubled by the poor visibility of the screen G20, or at a loss about how to operate.

In addition, user information including a user ID and the age of the user may be registered in advance in the storage unit 15, so that the control unit 18 can perform user authentication, by collating the user ID that has been inputted with the user ID stored in the storage unit 15. Then the display controller 183 may also perform an on/off control of the enlarged display mode, on the basis of the user's age. For example, when the user is younger than forty, the display controller 183 may decide not to enter the enlarged display mode. The user's age does not necessarily have to be registered in advance, and instead, the user's age may be inputted by the user through the operation unit 11, when the enlarged display mode is about to be entered.

Further, the display controller 183 may estimate a distance between the screen and the user's face, on the basis of image data acquired by the gaze line detection unit 12 immediately before the enlarged display mode is entered, and perform the on/off control of the enlarged display mode, on the basis of the distance estimated. For example, the display controller 183 may estimate the distance between the screen and the user's face, on the basis of the ratio of the user's face to the size of overall image data. When the estimated distance is shorter than a predetermined distance, in other words when the user's face is close to the screen, the display controller 183 may turn off the enlarged display mode, but turn on the enlarged display mode when the estimated distance is equal to or longer than the predetermined distance.

The display controller 183 may cause the printing unit 17 to print the help information 45 that has been displayed. In this case, the user can operate the screen G20, visually referring to the sheet on which the help information 45 on the screen G20 is printed.

The configurations and arrangements according to the foregoing embodiment, described with reference to FIG. 1 to FIG. 8, are merely exemplary, and in no way intended to limit the disclosure to those configurations and arrangements.

While the present disclosure has been described in detail with reference to the embodiments thereof, it would be apparent to those skilled in the art the various changes and modifications may be made therein within the scope defined by the appended claims.

What is claimed is:

1. A display device comprising:
   a display unit that displays a screen;
   a gaze line detection unit that detects a gaze line of a user directed to the screen; and
   a control unit that includes a processor, and acts, when the processor executes a control program, as:
      a gaze line concentration area detector that detects a gaze line concentration area on the screen, according to a trajectory of the gaze line on the screen detected by the gaze line detection unit;
      a counter that counts a number of display objects included in the gaze line concentration area, when the gaze line concentration area is detected; and
      a display controller that enters an enlarged display mode in which the display object is displayed in an enlarged size, when one display object is included in the gaze line concentration area, enters a help display mode in which help information is displayed, when no gaze line concentration area is detected, and enters the help display mode in which help information is displayed, when a plurality of display objects are included in the gaze line concentration area.

2. The display device according to claim 1, wherein the gaze line concentration area detector detects, when the screen is divided into a plurality of areas, an area that includes a largest amount of the trajectory, as the gaze line concentration area.

3. The display device according to claim 1, wherein the display controller displays the help information related to operation of the screen, when the gaze line concentration area is not detected.

4. The display device according to claim 1, wherein the display controller displays, when a plurality of display objects are included in the gaze line concentration area, the help information related to functions of the respective display objects.

5. The display device according to claim 4, wherein the display controller displays the help information so as not to overlap with the display object included in the gaze line concentration area.

6. The display device according to claim 1, wherein, in the enlarged display mode, the display controller changes the display object to be enlarged, each time the gaze line detected by the gaze line detection unit moves, to another display object located at a position corresponding to the gaze line.

7. The display device according to claim 1, wherein the display controller turns on or off the enlarged display mode, depending on an age of the user.

8. The display device according to claim 7, wherein the gaze line detection unit includes a camera that shoots a face of the user operating the display unit, and detects the gaze line of the user directed to the screen on a basis of image data from the camera, and
the display controller estimates a distance between the screen and the face of the user, on a basis of a ratio of the face of the user to the image data acquired by the gaze line detection unit immediately before the enlarged display mode is entered, and turns off the enlarged display mode when the estimated distance is shorter than a predetermined distance, but turns on the enlarged display mode when the estimated distance is equal to or longer than the predetermined distance.

9. The display device according to claim 1,
wherein, in the help display mode, the display controller changes the display object about which the help information is to be displayed, each time the gaze line detected by the gaze line detection unit moves, to another display object located at a position corresponding to the gaze line.

10. The display device according to claim 1,
wherein, when the gaze line detection unit detects the gaze line of the user directed to the screen, the gaze line concentration area detector monitors the trajectory of the gaze line on the screen for a predetermined time, calculates density distribution of the trajectory on the screen during the predetermined time, and detects an area where the calculated density distribution is higher than a predetermined threshold, as the gaze line concentration area.

11. An image forming apparatus comprising:
the display device according to claim 1; and
a printing unit that prints the help information.

\* \* \* \* \*